(12) United States Patent
Cheng

(10) Patent No.: US 9,906,431 B2
(45) Date of Patent: Feb. 27, 2018

(54) RAPID LOCALIZATION PLATFORM FOR LOCATION BASED APPLICATIONS IN SELF-ORGANIZED NETWORKING SYSTEMS

(71) Applicant: Wei Cheng, Glen Allen, VA (US)

(72) Inventor: Wei Cheng, Glen Allen, VA (US)

(73) Assignee: VIRGINIA COMMONWEALTH UNIVERSITY, Richmond, VA (US)

( * ) Notice: Subject to any disclaimer, the term of this patent is extended or adjusted under 35 U.S.C. 154(b) by 113 days.

(21) Appl. No.: 15/156,925

(22) Filed: May 17, 2016

(65) Prior Publication Data

US 2016/0366044 A1 Dec. 15, 2016

Related U.S. Application Data

(60) Provisional application No. 62/174,046, filed on Jun. 11, 2015.

(51) Int. Cl.
| | |
|---|---|
| H04L 12/751 | (2013.01) |
| H04W 4/02 | (2018.01) |
| H04L 12/733 | (2013.01) |
| H04W 40/20 | (2009.01) |
| H04W 84/18 | (2009.01) |
| H04W 8/00 | (2009.01) |

(52) U.S. Cl.
CPC .............. *H04L 45/02* (2013.01); *H04L 45/20* (2013.01); *H04W 4/02* (2013.01); *H04W 40/20* (2013.01); *H04W 8/005* (2013.01); *H04W 84/18* (2013.01); *Y02B 60/50* (2013.01)

(58) Field of Classification Search
CPC ........ H04L 45/02; H04L 45/20; H04W 40/20; H04W 4/02; H04W 84/18; H04W 8/005; Y02B 60/50
USPC ......................................................... 370/338
See application file for complete search history.

(56) References Cited

U.S. PATENT DOCUMENTS

| | | | |
|---|---|---|---|
| 8,712,444 B2 * | 4/2014 | Dahl ...................... | G01S 5/0205 342/450 |
| 2003/0063619 A1 * | 4/2003 | Montano ........... | H04L 29/12009 370/443 |
| 2004/0233855 A1 * | 11/2004 | Gutierrez ................ | H04L 45/00 370/252 |

(Continued)

OTHER PUBLICATIONS

Cheng et al, "Time and Energy Efficient Localization", 2014 Eleventh Annual IEEE International Conference on Sensing, Communication, and Networking (SECON), Jun. 30, 2014, pp. 81-89.

(Continued)

*Primary Examiner* — Stephen J Clawson
(74) *Attorney, Agent, or Firm* — Whitham, Curtis & Cook, P.C.

(57) ABSTRACT

Time-critical Location Based Service (LBS) applications in mobile ad hoc networks (MANETs) require fast localization. An On-Demand Fast Localization (ODFL) start from multi-coordinate systems, and the position transformation is integrated with LBS application information transmissions. The framework of ODFL turns two pipe-lined procedures into two semi-concurrent procedures by employing coordinate system transformation on a per hop basis, which consists of three components: (1) Local Coordinate System (LCS) construction; (2) embedded information selection; and (3) position transformation.

16 Claims, 9 Drawing Sheets

(56) References Cited

U.S. PATENT DOCUMENTS

| | | | | |
|---|---|---|---|---|
| 2006/0165025 A1* | 7/2006 | Singh | ...................... | H04L 45/02 |
| | | | | 370/315 |
| 2007/0005292 A1* | 1/2007 | Jin | ........................ | G01S 5/0289 |
| | | | | 702/150 |
| 2008/0309556 A1* | 12/2008 | Hohl | ..................... | G01S 5/0289 |
| | | | | 342/451 |
| 2010/0074140 A1* | 3/2010 | Markham | ............... | H04L 45/02 |
| | | | | 370/254 |
| 2010/0080175 A1* | 4/2010 | Kang | ................... | H04L 67/025 |
| | | | | 370/328 |
| 2012/0036198 A1* | 2/2012 | Marzencki | .......... | H04L 61/6081 |
| | | | | 709/206 |
| 2014/0274166 A1* | 9/2014 | Zhang | .................. | G01S 5/0278 |
| | | | | 455/457 |
| 2015/0355311 A1* | 12/2015 | O'Hagan | ................ | G01S 5/021 |
| | | | | 340/539.13 |
| 2015/0358696 A1* | 12/2015 | Yeo | ........................ | G08B 25/10 |
| | | | | 340/870.07 |

OTHER PUBLICATIONS

Cheng et al, "Time-Bounded Essential Localization for Wireless Sensor Networks", IEEE/ACM Transactions on Networking, Apr. 2013, pp. 400-412, vol. 21.

Cheng et al, "Time-Bounded Essential Localization for Wireless Sensor Networks", 2010 Fifth IEEE International conference on Networking, Architecture, and Storage, pp. 3-12.

\* cited by examiner

| Source Position in CLCS1 | CLCS1 ID | Bridge users' positions in CLCS1 |
|---|---|---|
| Source Position in CLCS2 | CLCS2 ID | Bridge users' positions in CLCS2 |
| Source Position in CLCS3 | CLCS3 ID | Bridge users' positions in CLCS3 |
| ...... | ...... | ...... |

FIG. 3

RAPID LOCALIZATION PLATFORM FOR LOCATION BASED APPLICATIONS IN SELF-ORGANIZED NETWORKING SYSTEMS

CROSS-REFERENCE TO RELATED APPLICATION

This application is based on provisional patent application Ser. No. 62/174,046 filed Jun. 11, 2015, for "Rapid Localization Platform for Location Based Applications in Self-Organized Networking Systems", the benefit of the filing date of which is claimed.

BACKGROUND OF THE INVENTION

Field of the Invention

The present invention generally relates to time critical Location Based Service (LBS) applications in mobile ad-hoc networks and, more particularly, to a platform for self-organized networking systems localization.

Background Description

The success of an LBS application depends on two pipelined procedures: localization of a device and information transmission. The localization problem has been extensively studied under a number of contexts such as wireless sensor networks, mobile ad-hoc networks (MANETs), and IEEE 802.11 wireless networks. Under the conventional localization definition, localizing both the source and the destination devices in the same co-ordinate system is a necessary condition to start the information transmission of an LBS application.

The conventional localization procedure, initiated from a few anchors, propagates the localization information to all users via flooding. As a result, the localization time is bounded below roughly by $T_{min}(r_h, t_1, k)$ defined by the following formula:

$$T_{min}(r_h, t_1, k) = (k \times r_h) \times (t_1 + \Delta_D), \quad (1)$$

where $r_h$ is the radius of the network in the form of the number of hops, $t_1$ is the time needed for localizing one user (including the processes of direct neighborhood discovery, distance measurement, and trilateration, k is a parameter related to the positions of anchors, and $\Delta_D$ is the average transmission delay at each user.

For a typical network setup with three anchors deployed in the center of a network, we have k=1, where $T_{min}(r_h, t_1, k)$ is the minimum time for transmitting a message from a user in the center to a user on the border. The localization time $T_{min}(r_h, t_1, 1)$ is also the lower bound for relative localization where each user starts localization by constructing a Local Coordinate System (LCS) itself. The reason is that the conventional localization definition requires that all the users be localized in the same coordinate system. In other words, the positions of the users under their own LCSs need to be transformed to the global coordinate system, and the position transformations also need to propagate information across the entire network.

Consequently, an LBS application has to wait for at least $T_{min}$ time before transmitting information. While $T_{min}$ may be suitable for time-critical LBS applications in static networks, where the localization procedure only needs to be conducted once, it may not be good for those in MANETs, whose network topology may have changed dramatically during the Tmin time frame, preventing the conventional localization procedure from localizing all users in the same co-ordinate system. As a result, LBS applications could fail because information transmission cannot start, which may also cause excessive amount of energy consumption because the localization process usually keeps trying to localize all the users in a network. Even if the source can eventually obtain a position of the destination, this position may be an old one that is far away from the current position of the destination. Therefore, the convention localization techniques cannot be directly applied to time-critical LBS applications in MANETs.

Deploying a large number anchors is a simple solution, with the purpose that every spot in the network can be covered by three non-collinear, or four non-coplane, anchors for two-dimensional (2D), or three-dimensional (3D) localization. Another solution is to equip every user with a Global Position System (GPS) receiver. These two solutions, however, may not be practical for the following reasons: (1) Deploying a large number of anchors may be impossible, or uneconomical, even if deployment is not an issue. (2) the GPS satellites may be destroyed or interfered by opponents in a battle field. (3) Not all the users always turn on their GPS receivers.

SUMMARY OF THE INVENTION

We provide a framework of On-Demand Fast Localization (ODFL) from a different angle of view, which turns the two pipelined procedures into two semi-concurrent procedures. It employs coordinate system transformation on a per hop basis, which consists of three components: (1) LCS construction; (2) embedded information selection; and (3) position transformation.

Conventionally, location based applications should always start after the localization procedure. In other words, two users have to know and understand each other's locations before starting the applications. Radically different from the conventional cognition, we have provided a system and method in which location based applications start earlier without the need of the whole network localization. In addition, in order to expedite the localization, the invention also reduces energy consumption, enhances the location privacy, improves location accuracy, and preserves the localizability.

According to the invention, an infrastructure-free fast localization scheme for MANETs is provided. Moreover, under the conventional localization definition, the information source has no position privacy, as all users can overhear LBS messages and learn the positions of embedded sources. To address these issues, we formulate a novel concept of On-Demand Fast Localization (ODFL) from a new perspective to start LBS applications at the earliest time. In ODFL, we carry out the conventional pipelined procedures of localization and information transmission via two semi-concurrent procedures, so that we can start LBS Applications before the destinations are localized. The contributions provided by the invention are summarized as follows:

A new direction of the localization is initiated by integrating the localization procedure with routing to support time-critical LBS applications in MANETs.
  A novel concept of On-Demand Fast Localization is formulated which only involves the users that are necessary for location transformation along the routing path.
  A framework of ODFL that can be implemented over most routing protocols is devised. ODFL can significantly reduce the localization time and the energy consumption.

The superiority of ODFL is demonstrated in terms of shorter localization time, lower energy consumption, higher LBS success ration, and improved position privacy.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is an illustration of an embedded information format;

DETAILED DESCRIPTION THE INVENTION

Figure 1:
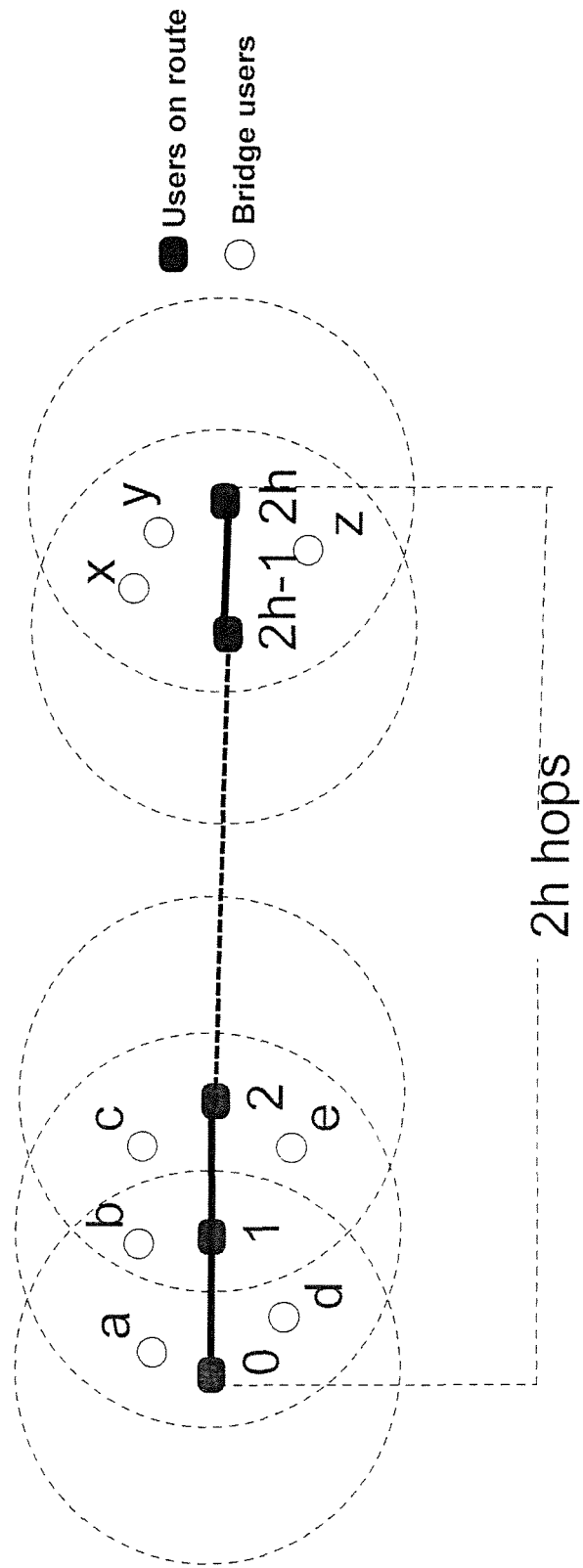
FIG. 1 is a diagram illustrating an On-Demand Fast Localization (ODFL) example.

In describing our invention, we consider LBS applications in a general network model, where there exist a small number of base stations and a large number of mobile users. Using multi-hop routing, the mobile users send messages containing their positions to the destinations, which could be base stations or other users. The success of message delivery relies on the adopted routing protocols, the user mobility, and the channel conditions. The ultimate goal of localization is to support LBS applications in MANETs. We consider the success of LBS applications ast that the destinations can understand the source positions under the same coordinate system after receiving the messages.

The general model can be applied to time-critical LBS applications such as military reconnaissance in battle fields and road emergent information sharing in vehicular networks. Specifically, in the military reconnaissance application, scouts (or military robots) are the mobile users who may move at high speeds in a battle field. They share collected information with each other and report it to the command stations (base stations). The transmitted information contains both the military information and the positions from which the information is collected. As scouts may reconnaissance behind enemy lines, fast localization and immediate information transmission are invaluable for their safety and the military decision analysis. Similarly, for vehicular network applications, a vehicle (mobile user) needs to share the road emergent information with other vehicles or road-side station (base stations) that may be several miles (multi hops) away from it. As the network topology is highly dynamic, it is critical to localize emergent events instantly and send the information out as soon as possible.

The fundamental flaw in conventional approach is that it requires the information source and destination to be localized under the same coordinate system before any information transmission can be initiated. This serializing approach could seriously delay the starting time of supported LBS, which as to be discussed later, might cause unacceptable repercussion to quality of service in terms of localization accuracy in a highly dynamic mobile network. Furthermore, conventional approach relies on flooding in the network to disseminate location information. This demands all nodes in the network to participate in the location updating and forwarding process, even when a large portion of them are irrelevant and far away from the actual information transmission route. In a mobile network this process would have to be performed constantly. As a result, the overall communication overhead will be significantly increased while energy efficiency will be decreased.

After all the ultimate objective of an LBS application is to allow the destination to successfully decode the source position (embedded in the messages) in its own coordinate system. This objective can be achieved by creating Local Coordinate Systems (LCS) at each node and performing local coordinate system position transformation between consecutive nodes along the route.

Take scenario illustrated in FIG. 1 as an example, where node $0$ needs to transmit a location-aware message to node $2h$ which is $2h$-hops away. We denote node $0$ as source and node $2h$ as destination. Location of source node $0$ in this case is also the source location of event. Dashed circle represents communication range of nodes, and nodes resided within one's communication range are one's 1-hop neighbor.

Without waiting for $T_{min}(h, t_1, 1)$ for location information to propagate from anchors, source can start immediately after 2-hop topology is acquired in $T_{min}(1, t_1, 1)$, by actively localizing neighbors in its own LCS, $LCS_0$. LCS is created and represented by choosing three non-collinear interconnected nodes from the neighbors. Other neighbors or the source itself can be subsequently localized in the LCS if necessary ranging information is available. Following the same procedure, the next hop node (node 1) can also create $LCS_1$ and localize some of its neighbors. Position of localized node, including the source, in one LCS can be transformed into a position in the next LCS, if more than three nodes can be localized in both LCSs. These commonly localized nodes are denoted as bridge nodes, and their positions will be embedded in the message together with source position and passed on to next hop to enable the LCS position transformation. In this example, source will localize positions of node a, b, and d, and embedded them as bridge nodes with position of node 0. Upon receiving the message, node 1 can check if node a, b, and d are also localized in $LCS_1$. If so source position will be transformed to position in $LCS_1$. Such process will continue hop by hop until the message reaches node $2h$, for which the source position is transformed from $LCS_{2h-1}$ to $LCS_{2h}$. To this end, node $2h$ can understand the position of node 0 under its own LCS: the ultimate objective is achieved.

Unlike in the conventional two pipelined procedures, we note that for LBS applications, it is not necessary for every user to be localized in the same coordinate system before a message with location context is transmitted. The ultimate objective of an LBS application is to allow the destination to successfully decode the source position (embedded in the messages) in its own coordinate system.

Accordingly, for the LBS application between user 0 and user $2h$ in FIG. 1, where the dashed circle represents the user's communication range, the earliest time for starting the information transmission is $T_{min}(1, t_1, 1)$, not $T_{min}(h, t_1, 1)$. We illustrate the details below.

Suppose that user 0 is the information source, who initiates a one-hop localization procedure when it is ready to send a message to user $2h$. It localizes itself and its direct neighbors (such as users a, b and d) in $LCS_0$ (Local Coordinate System at user 0). Similarly, users $1, 2, \ldots, 2h-1$, and $2h$ on the information route localize their direct neighbors (possibly including themselves) in $LCS_1, LCS_2, \ldots LCS_{2h-1}$, and $LCS_{2h}$, respectively.

Although not all the users are localized in the same coordinate system, user 0 can start transmitting messages with certain tailored, embedded information for coordinating transformation after the success of its one-hop localization procedure ($T_{min}(1, t_1, 1)$). In this example, user 0's tailored embedded information consists of the positions of users a, b and d, which are the bridge users in $LCS_0$, where bridge users are the users whose positions in two consecutive LCSs can help with the position transformation.

After receiving the message, user 1 knows the positions of users 0, a, b and d in $LCS_0$. It then transforms user 0's position in $LCS_0$ to the corresponding nodes in its $LCS_1$.

To transform between two 2D (3D) LCSs, a sufficient and necessary condition is that at least three (four) non-collinear (non-coplane) users are localized in both the LCSs. Since the bridge users a, b and d are also the direct neighbors of user 1, their positions in $LCS_1$ are also available. This enables user 1 to transform the position of user 0 from $LCS_0$ to $LCS_1$. It can then forward the message to user 2 while embedding the positions of user 0 and bridge users b, c and e in $LCS_1$.

Consequently, we can derive in analogy that user 2h can receive the positions of user 0 and bridge users x, y and z in $LCS_{2h-1}$. It can eventually obtain the position of user 0 in $LCS_{2h}$ through coordinate transformation. Therefore, the ultimate objective of LBS application is achieved; i.e., user 2h knows the positions of both 0 and itself in the same coordinate system $LCS_{2h}$. We can see from this example that the earliest time for starting the information transmission is $T_{min}(1, t_1, 1)$.

From the example described above, we know neither user 0 nor user 2h can be localized in the same coordinate system after $T_{min}(1, t_1, 1)$ time. Nevertheless, all future steps needed for localization transformation can be embedded into the procedure of information transmission, and the destination can successfully obtain the position of the source in its LCS after receiving the message. We can see that part of the localization process can be seamlessly integrated into the subsequent information transmissions, incurring limited extra overhead. We therefore argue that the conventional definition of localization is inappropriate for evaluating the start time of LBS applications. We can see that part of the localization process can be seamlessly integrated into the subsequent information transmissions, incurring limited extra overhead. Based on this observation, we define the concept of On-Demand Fast Localization (ODFL).

Definition 1: On-Demand Fast Localization starts from multi-coordinate systems, and the position transformation is integrated with LBS applications information transmissions.

In particular, ODFL captures the earliest time for starting LBS applications. Each intermediate user on the route can help transforming the information of the position of the source to the one in its next-hop user's coordinate system until the destination successfully obtains the position of the source in its own coordinate system. Based on this per hop location transformation method, LBS applications can start right after the information source localizing itself in its own coordinate system. In other words, information transmissions of LBS applications can start before all the users are localized in the same coordinate system. The start of the second procedure in the original pipeline no longer depends on the success of the first procedure.

We devise a framework of ODFL from a different angle of view, which turns the two pipelined procedures into two semi-concurrent procedures. It employs coordinate system transformation on a per hop basis, which consists of three components: (1) LCS construction; (2) embedded information selection; and (3) position transformation. These steps will be described with reference to FIG. 2 which shows a topology of a mobile ad hoc network at a particular point in time in which each node of the network represents a mobile user. Each mobile user in the network includes a data processor and a database for processing these three components. Communication between the nodes is by means of separate transmitter and receiver of transceiver installed at each mobile user.

1) LCS construction: The first component of ODFL is to construct a local coordinate system at each user on the information route so that the bridge users can be localized. The procedure of LCS construction is composed of two steps: (1) local information collection and (2) LCS construction.

Figure 2:
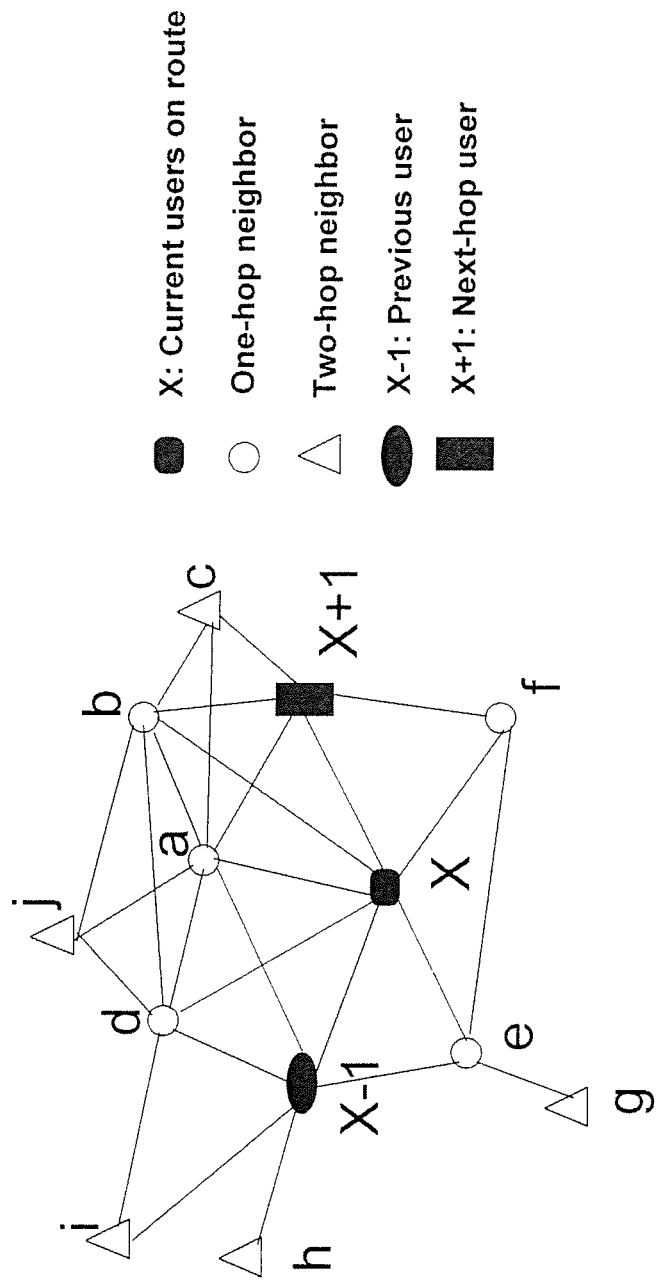
FIG. 2 is a diagram illustrating a user's two-hop topology for Local Coordinate Systems (LCS) construction.

In Step (1), each user on the routing path first broadcasts an information-request message as shown in FIG. 2 to its direct neighbors. The message consists of the following components: "User ID" to identify the user who initiates the request, "Info Req" to indicate the message type, and "Next Hop User ID" to indicate who is the next hop user for transmitting the information. Note that a user can obtain the ID of its next hop user after the route construction via routing protocols. Each of the user's neighbors replies with the information of its one-hop topology, which can be obtained via round trip communications for neighbor discovery.

Note that the distances between users should also be measured in this step. For the users on the information transmission route, they collect information in a chain procedure. In other words, each intermediate user initiates its information collection only after receiving the previous user's information request message. Each intermediate user can derive its two-hop topology for LCS construction as shown in FIG. 2. Note that there are no edges between two-hop neighbors.

An LCS can be constructed by finding three mutually connected users (such as users a, b, and X) to form a coordinate system, which is denoted by its LCS ID (such as angle a, b, X). Multiple LCSs may exist in the two-hop topology of the user. The set of users that can be localized in each LCS can be obtained via trilateration in $O(\beta)$ time, where $\beta$ is the maximal node degree in the user's two-hop topology. Then, these LCSs can be merged into a number of candidate LCSs (denoted by CLCSs) according to the condition of coordinate transformation. Therefore, the current user in FIG. 2 can have a few CLCSs and the users that can be localized in these CLCSs after Step (2). Note that some users may be localized in more than one CLCSs, and that any two CLCSs cannot localize more than two common users as they are not mutually transformable. For the example in FIG. 2, the current user can have five CLCSs: angle a, b, X, angle d, I, X−1, angle e, X−1, X, angle e, f X, and angle f X, X+1. Users a, b, c, d, j, X−1, X, and X+1 are local CLCS angle a, b, X; users d, I, and X−1 are localized in angle d, I, X−1; users e, X−1, and X are localized in angle e, X−1, X; users e, f, and X are localized in angle e, f, X; users f, X, and X+1 are localized in angle f, X, X+1.

2) Embedded information selection: The objective of this component is to embed appropriate information into the message at each hop to transform source position on a per-hop basis. Suppose that the current users can obtain the corresponding users of the source in their CLCSs. They embed the information from a data source as shown in FIG. 3 into the message for helping the next-hop user with position transformation. Based on the embedded information, the next-hop user can transform the source positions to the corresponding ones in its CLCSs when three or more bridge users in a row of FIG. 3 can be localized in one of its CLCSs. Note that the next-hop user may obtain the source's corresponding positions in multiple CLCSs.

In general, each user on the information transmission route is ready for the position transformation after LCS is constructed. Note that not all the users in the two-hop topology could be the bridge users that can help with the position transformation at the next-hop user. As there is no edge between any two two-hop neighbors, any of the current user's two-hop neighbors may also appear in the next-hop user's two-hop topology. Moreover, the current user cannot identify the users that cannot be localized by the next-hop user because it does not know the next-hop user's two-hop topology. As a result, every localized user could be a bridge user. In order to maximize the probability of position transformation, we conservatively choose to embed all the users' positions in the CLCSs, where the source and at least three non-collinear bridge users can be localized, into the message. It is therefore unnecessary to embed all the users' positions in all the CLCSs into the information message for maximizing the probability of successful position transformation. Moreover, too much embedded information will waste more energy, increase the transmission time, and potentially expose the position of information source to more users. Consequently, we target on selecting the proper embedded information so that message length and the possibility of position leakage to non-on-route users can be reduced while the probability of successful position transformation can be maximized. Note that each user on the information transmission path may have an idea about which users in his two-hop topology can be localized in both its CLCSs and its next-hop user's CLCSs, as the user knows its next-hop user's one-hop topology. For the example in FIG. 2, the current user can ensure that users a, b, and c can each be localized by themselves and their next-hop users. According to the condition of coordinate system transformation, the awareness of the positions of three non-collinear users in two CLCSs is sufficient for position transformation between the two CLCSs. Intuitively, the current users only need to embed the positions of three bridge users (such as a, b, and c) in one of its CLCSs (such as angle a, b, X) into the message for transforming the position of the source to the corresponding position in one of the next-hop user's CLCSs. This intuitive selection method, however, can only guarantee the success of the position transformation at the next-hop user in dense networks with at least three such users. In other words, it is good for one-hop transformation. However, it may decrease the probability of successful position transformation at the destinations, because the next-hop user cannot transform the source's position from one of its CLCS to another. For example, under the intuitive selection method, the previous user may choose to embed the positions of users d, I, and X−1 in angle d, I, X−1 into its message sent to the current user in FIG. 2, and the current user may chose the positions of users a, b, and X in angle a, b, X for help the next-hop user with position transformation. Based on information embedded by the previous user, the current user can successfully obtain the source's position in angle d, I, X−1, but it cannot transform the source's position to the corresponding one in angle a, b, X. As a result, the next-hop user cannot form the embedded information for its next-hop user, which results in the failure of the position transformation. It is therefore necessary to carefully choose the embedded information. As there is no edge between any two two-hop neighbors, any of the current user's two-hop neighbors may also appear in the next-hop user's two-hop topology. Moreover, the current user cannot identify the users that cannot be localized by the next-hop user because it does not know the next-hop user's two-hop topology. As a result, every localized user could be a bridge user. In order to maximize the probability of position transformation, we conservatively choose to embed all the users' positions in the CLCSs, where the source and at least three non-collinear bridge users can be localized, into the message. Because the CLCSs can not transform to each other at the next hop user it is still necessary to embed all the current user's one-hop neighbors' positions in all the CLCSs into the message such that the probability of successful transformation can be maximized. We therefore target on finding the LCS that can maximize the probability of successful position transformation in step 3. The LCS selection criteria slightly vary depending on the role of user on the route. The embedded information include the user's LCS, and the coordinates of the user and his neighbors in the LCS. With the tailed information, each intermediate user transforms the source location to the corresponding one in its own LCS. Moreover, the success of LCS transformation is based on the embedded tailored information. Intuitively, the success rate can be increased if more contents can be embedded. However, this is a tradeoff as collecting multi-hop information increases the duration of localization and results in more delays on starting LBS applications. Assuming that the user's mobility models are randomly walk and traffic following, we will study the relationship between the LCS construction methods and the network density through probability based analysis. The user embeds his LCS and the positions of himself and his neighbors to the regular payload messages. The users on the route then can help with the location transformation based on the received embedded information.

3) Position transformation: Upon receiving the embedded information from the previous user, the current user accesses a position database and transforms the position of the source to the corresponding one in its CLCS through solving $(x, y)$ from Equations (2), where $(x, y)$ and $(x', y')$ are the coordinates of the source in the current user's CLCS and in the previous user's CLCS, respectively; $(x_1, y_1)$, $(x_2, y_2)$, and $(x_3, y_3)$ are the positions of the three bridge users in the current user's CLCS; $(x'_1, y'_1)$, $(x'_2, y'_2)$ and $(x'_3, y'_3)$ are the bridge users' corresponding positions in the previous user's CLCS; Note that x and y are the only unknowns in Equations. (2) as the current user can obtain $(x', y')$, $(x'_1, y'_1)$, $(x'_2, y'_2)$ and $(x'_3, y'_3)$ from the previous user's embedded information, and it can also acquire $(x_1, y_1)$, $(x_2, y_2)$ and $(x_3, y_3)$ after its LCS construction procedure. The solution is unique as long as the three bridge users are non-collinear.

$$(x-x_1)^2+(y-y_1)^2=(x'-x'_1)^2+(y'-y'_1)^2$$

$$(x-x_2)^2+(y-y_2)^2=(x'-x'_2)^2+(y'-y'_2)^2$$

$$(x-x_3)^2+(y-y_3)^2=(x'-x'_3)^2+(y'-y'_3)^2 \qquad (2)$$

Each user reacts based on the events defined in Table 1. The pseudocode executing at each user is presented in the following:

TABLE 1

| Event Name | Description |
|---|---|
| Event_LBS_Ini | Initiate LBS message transmission |
| Event_Rev_Info_Req | Receive an information message |
| Event_Rev_Neb_Dis | Receive a neighbor discovery |
| Event_Rev_LBS-Pkt | Receive a packet containing LBS |

```
    Handling(Event\_LBS\_Ini)
1.  Construct LCS;
2.  Embed information into the LBS message;
    Handling(Event\_Rev\_Info\_Req)
3.  Broadcast a neighbor discovery message;
4.  Wait for Δ_{t1} time for building its one-hop topology;
5.  Send its one-hop topology to the user who sent the information
    request message;
6.  if The user itself is the next-hop user then
7.      Construct LCS;
8.  end if
    Handling(Event\_Rev\_Neb\_Dis)
9.  Send itself's user ID to the user who sent the neighbor discovery
    message;
    Handling(Event\_Rev\_LBS\_Pkt)
10. Wait until its CLCSs have been constructed;
11. if the user itself is the destination then
12.     Remove the CLCSs in which the position of the user itself
    is not available;
13. end if
14. for each row in the embedded information (FIG 3}
    do
15.     for {each CLCS} do
16.         if the positions of at least three non-collinear bridge
    users are available in this CLCS then
17.             Transform the source position to the
    corresponding one in this CLCS through solving Equations. 2;
18.         end if
19.     end for
20. end for
21. if the source position is available in any of the user own
    CLCSs then
22.     if the user itself is the destination then
23.         Return LBS success;
24.     else
25.         Embed information into the LBS message;
26.     end if
27. else
28.     Return LBS failure;
29. end if
    Functions:
30. function CONSTRUCT LCS
31.     Broadcast its information request message;
32.     Wait forΔt_2 time for building its two-hop topology
33.     Construct CLCS;
34. end function
35. function EMBED INFORMATION INTO THE LBS MESSAGE
36.     for each CLCS do
37.         if the source position in this CLCS is available then
38.             if the positions of at least three non-collinear users
    are available in this CLCS then
39.                 Embed the CLCS ID, the source position, and
    the positions of all the users in this CLCS into the message;
40.             end if
41.         end if
42.     end for
43.     if no information has been embedded then
44.         Return LBS failure;
45.     else
46.         Transmit the message to its next-hop user;
47.     end if
48. end function
* Δt_1 and Δt_2 are set according to the real network setup.
* Δt_2 ≈ β + 1) × Δt_1.}
```

Metrics and Impact Factors:

The framework of on-demand fast localization is event-driven and fully distributed. Its localization procedure is initiated only on demand. We evaluate its performance on the LBS success ratio, localization time, energy consumption, position privacy, and position accuracy. The performance metrics are defined as follows:

Definition 2: LBS Success Ratio is the ratio of the number of returned LBS success (line 23) to the total number of returns (line 23+line 28+line 44).

Definition 3: ODFL Time is the starting time for transmitting an LBS message at the information source (line 2).

Definition 4: Eventual Localization Time is the time for the destinations to receive an LBS message and to decode the source position (line 23).

Definition 5: LBS Energy Consumption is the total energy consumed by successfully transmitting an LBS message to the destinations (line 23).

Definition 6: Source Position Leakage is the total number of users that are not on the information transmission route but can capture the LBS message in the air and decode the source position.

Definition 7: Source Position Accuracy is the accuracy of the source position in the destination's CLCS (line 17).

We also define two factors that have impacts on the above performance metrics as follows:

Definition 8: User Velocity is the moving speed of the mobile user, which determines the frequency and gradient of topology changes.

Definition 9: Transfer Time is the time between the message forwardings (line 46) issued by two consecutive intermediate users (such as the previous user and the current user). In other words, it is the time required by an intermediate user before forwarding a message to its next-hop user. The transfer time determines the extent of bridge user's changes in terms of position and availability.

Note that the transfer time is determined by the channel condition, the system and hardware, and the variance of number of two-hop neighbors at the two consecutive users; but it is not necessarily related to $\Delta t_1$ and $\Delta t_2$, as the next-hop user starts constructing its LCS (line 6) before receiving the application's message. It means that the transfer time could be very small (only including the time spent on receiving the message, transforming the positions, and forwarding the message) if constructing the LCS at two consecutive users takes roughly the same time.

Performance Analysis

LBS Success Ratio

Figure 4:
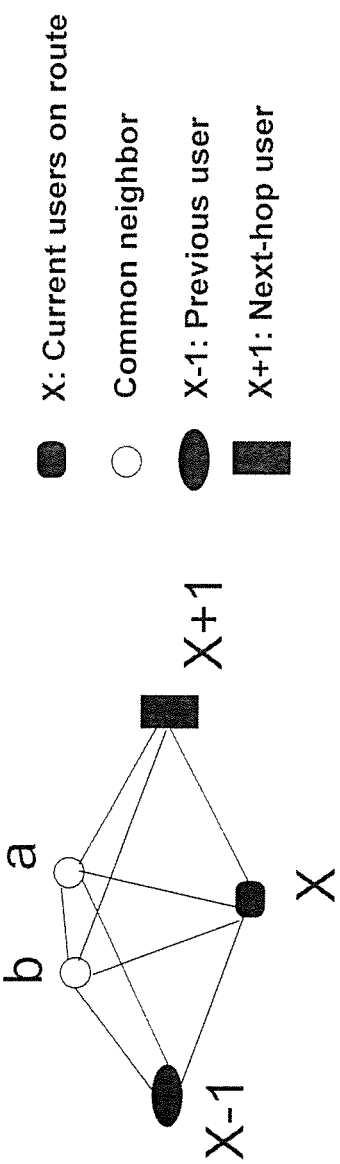
FIG. 4 is a diagram illustrating a minimum topology for success position transformation.

In the framework of ODFL, the success of LBS depends on the success of source position transformation at each user on the information transmission route. We define the success of an intermediate user based on the existence of at least one CLCS that (I) can localize three non-collinear users, which can also be localized in one of its previous users CLCSs where the source position is available; and (ii) can localize three non-collinear users, which can also be localized in one of its next-hop users CLCSs (where the destination position should be available if the next-hop user is the destination). As the previous user and the next-hop user should not be able to directly discover each other under most routing protocols, to guarantee success, we require that the minimum node degree for the intermediate user be four (one connection is from the previous user, one from the next-hop user, and two from the common neighbors). FIG. 4 presents an example where the intermediate user (X)'s node degree is four and an LBS application can succeed if X−1 and X+1 are the source and the destination, respectively. In this example, the coordinate system angle a, b, X is the CLCS that can guarantee the success of LBS.

In practice, however, the node degree of 4 may not be sufficient to guarantee the success of LBS. The LBS success ratio is also determined by the network density, the user distribution model, the user velocity, and the transfer time.

Localization Time

It follows from the framework design (line 2 and line 46) that an LBS application can start its procedure of information transformation approximately after $\Delta t_2 + \Delta_c$ time, where $\Delta t_2$ is the time required for constructing a user's two-hop topology and $\Delta_c$ is the time for constructing the LCS. Consequently, the ODFL time can be calculated by $$\Delta t_2 + \Delta_c \quad (3)$$

As the maximum node degree is $\beta$ and $\Delta t_1$ is the time required for constructing a user's one-hop topology, we have $\Delta t_2 \approx (\beta+1) \times \Delta t_1$. In other words, the time for constructing a two-hop topology roughly equals the summation of the time required by constructing $\beta+1$ one-hop topologies, for the user and every direct neighbor of the user all need to discover their direct neighborhoods. For physical localization, where the distance information between any two anchors is not required, $\Delta t_1 + \Delta_c \approx t_1$, where $t_1$ is defined by Equation (1).

Assuming that the source position can be successfully decoded at the destination, the eventual localization time should equal the aggregated time spent at all the users on the information transmission route (line 2+line 25+line 14). For each intermediate user, the time spent on supporting an LBS message transmission consists of four parts: (1) responses to the previous user's information request; (2) construction of two-hop topology; (3) construction of the LCS; and (4) transmission of the message to the next-hop user. Note that the consumed time of the first part completely overlaps with the time of the previous user's two-hop topology construction. As a result, we do not consider that this time is consumed by the current user. Then each user spends $\Delta t_1 + \Delta_c + \Delta_D$ time for supporting an LBS message transmission, where $\Delta_D$ is the average transmission delay defined in Equation (1). Note that the time for parts (2), (3), and (4) may also overlap with the time on parts (2) and (3) of the user's next-hop user. Thus, the localization time is bounded above by $$d_h \times (\Delta t_2 + \Delta_c + \Delta_D) + (\Delta t_2 + \Delta_c) \quad (4)$$

where $d_h$ is the number of hops on the routing path. Under the conventional localization definition, theoretically, the earliest time for starting an LBS message transmission is $T_{min}(r_h, t_1, 1 = r_h \times (t_1 + \Delta_D))$ in relative localization. Since the ODFL time is only $\Delta t_2 + \Delta_c$, the framework of ODFL can reduce the waiting time before starting LBS applications from a linear function of $t_1$ to a constant that approximates to $t_1$. The earliest time for the destination to successfully receive an LBS message is bounded below by $r_h \times (t_1 + \Delta_D) + d_h \times \Delta_D$ under the traditional definition and based on the assumption that the source can guarantee that the destination can be localized in the same coordinate system after $r_h \times (t_1 + \Delta_D)$ time. Note that this lower bound is in general larger than the upper bound of ODFL's localization time when $d_h < \tau_h$. It is also important to note that the real time required by localization and the improvement of on-demand fast localization depend on the network topology, the mobility model, the traffic model, and the underlying routing protocol.

Position Accuracy

Under the framework of ODFL, the accuracy of the source position at the destination depends on the accuracy of localization at each user on the routing path. Thus, the position error is an accumulated error. Assuming that the inaccurate ranging is the major source of localization error at each user, the accumulated error caused by position transformation is comparable with the one caused by trilateration because the right-hand-side parts of the equations in Equations (2) can be considered as the distances at the previous user. In other words, ODFL is comparable with the conventional multi-lateration localization techniques on position accuracy in static networks. In mobile networks, the source position may change frequently during the conventional network localization time, causing an additional position error, which may be so large to cause endless localization procedures. Therefore, ODFL is expected to have a better source position accuracy, which is determined by the user velocity and the transfer time.

Since nodes are unable to take position snapshot and record movements after event, localization error is an inevitable result of various delays in mobile networks. Assuming a reasonably small ranging delay, localization error in conventional approach mainly consists of two parts: 1) intermediate error accumulated along the transmission route due to delay of finding three localized neighbors for each intermediate nodes to acquire their position with trilateration; 2) source error caused by the delay between the event time and when the source finally localizes itself. Longer overall localization time incurs larger source error.

With ODFL on the other hand, the source error can be significantly reduced or essentially removed, since source can localize itself in LCSs as soon as ranging to neighbors is completed. Intermediate error exists during position transformation at each intermediate node, in terms of the delay in finding and localizing bridge nodes. Localization error is accumulated as source position is translated from one LCS to another. Nonetheless, considering inaccurate ranging would be the same dominating factor for localizing nodes in both ODFL and conventional approaches, this accumulative error in ODFL is at most comparable to the intermediate error in conventional approaches. As a result, ODFL can achieve higher localization accuracy by starting ODFL process as early as possible to minimize source error.

Energy Consumption

Energy saving has always been an important concern for mobile applications. Generally, the on-demand fast localization can save the energy consumption caused by LBS applications because it eliminates the unnecessary transmissions carrying only localization information by integrating the transmissions of position transformation into the application's payload transmissions. Moreover, the energy consumption is more controllable as the expected ODFL time is a constant and only the users on the route and their two-hop neighbors will be involved in the localization procedure. On the contrary, the conventional localization techniques incur much higher and unpredictable energy consumption for localization, for the localization procedure may not stop in highly dynamic mobile networks and it may have to involve all users.

We measure the energy consumption by counting the number of transmissions and receptions used to support LBS applications, as they usually incur much higher energy cost than position computations. Under the framework of ODFL, each user on the routing path needs to transmit four types of messages: (1) an information request; (2) responses to the information requests from its previous user (except the source) and its next-hop user (except the destination); (3) responses to its direct neighbor's neighborhood discovery request; (4) transmission of the LBS message to its next-hop user (except the destination). Note that it is not necessary to transmit the third type of message because the use's direct neighbors can discover the user after receiving the information request message, and that the user only needs to respond to the information request once, for its next-hop user can also obtain the message. The number of users on the routing path is $N_0 = d_h + 1$. Thus, the total number of transmissions on the routing path is $$3 \times N_0 - 1 = 3d_h + 2. \quad (5)$$

The users, whose minimum distance to the users on the routing path is one hop, need to transmit additional two types of messages: (5) a neighborhood discovery request and (6) responses to the information requests. The number of such one-hop users is bounded above by $N_{1\text{-}hop}=(d_h+1)\times\beta-2\times(d_h-1)-2$, for at least two direct neighbors of each intermediate user, one direct neighbor of the source, and one direct neighbor of the destination are on the path. Note that the one-hop user only responds to the information requests once, for all its direct neighbors can receive the message. Consequently, the number of transmissions at all the one-hop users is bounded above by $$2\times N_{1\text{-}hop}=2(\beta-2)d_h+2\beta. \qquad (6)$$

The users, whose minimum distance to the users on the routing path is two hops, only need to (7) respond to the neighborhood discovery request from the one-hop users. The number of such two-hop users is bounded above by $N_{2\text{-}hop}=(\beta-1)\times N_{1\text{-}hop}$, for each one-hop user has at least one direct neighbor on the routing path. Note that each two-hop user may need to respond at most $\beta$ times as all its direct neighbors could be the one-hop users, which may send their neighborhood discovery requests at different times. Therefore, the number of transmissions at all two-hop neighbors is bounded above by $$\beta\times N_{2\text{-}hop}=\beta(\beta-1)(\beta-2)d_h+\beta^2(\beta-1). \qquad (7)$$

It follows from Equations (5), (6) and (7) that the total number of transmissions for supporting an LBS message is bounded above by $$(\beta^3-3\beta^2+4\beta-1)d_h+\beta^3-\beta^2+2\beta+2. \qquad (8)$$

The users in the network transmits a total of seven types of messages, which can be categorized into three classes: broadcast, multicast, and unicast. In particular, type (1), (5), and (6) belong to broadcast, type (2) (up to two receivers) belongs to multicast, and type (4) and (7) belong to unicast. Accordingly, we can obtain the upper bound of the total number of receptions in Equation (9) as follows:

$$\beta(N_0+2N_{1\text{-}hop})+2N_0-2+(N_0-1)+\beta N_{2\text{-}hop}= (\beta^3-\beta^2-\beta+3)d_h+\beta^3+\beta^2+\beta \qquad (9)$$

We can see from time bounds (8) and (9) that the upper bound of the total number of transmissions and receptions under on-demand fast localization is $O(d_h)$ when the maximum node degree $\beta$ is a constant.

Using the conventional localization technique, all the users in a network need to broadcast their positions at least once. As a result, the localization procedure needs at least N transmissions and $N\beta$ receptions, where N is the number of users in the network. Consequently, the total number of transmissions and receptions for supporting an LBS message is at least $N+d_h$ and $N\beta+d_h$, respectively. It means that the energy consumption under conventional localization techniques is $O(N)$, which is in general larger than $O(d_h)$ under on-demand fast localization.

This is radically different from the traditional localization energy consumption, which is simply defined as the total amount of energy used on transmitting localization packets, the calculation of energy consumption for essential localization is more complex in both the spatial domain as well as the temporal domain. As parts of the localization transmissions are integrated with the application's payload transmissions, the energy consumption of localization should be precisely identified from that consumed by the application traffic. Moreover, we should also consider the application message delay, which may be caused by the localization transformation under AODV (ad-hoc on-demand distance vector routing) protocol. The tradeoff between the energy saving and the transmission delay will be addressed in the design of the energy consumption metrics. The designed metrics will be evaluated under several network settings through both numerical analysis and experiments. An energy efficient on-demand fast localization scheme will be developed accordingly.

In this task, we will focus on designing a metric for evaluating the energy consumption of mobile essential localization and an energy efficient localization scheme with the consideration of fast localization. According to the idea of on-demand fast localization, the energy consumption can be categorized into three classes. The first one is the energy used purely for localization (step 1). Given an instant network topology, the consumed energy will only depend on the selected LCS construction methods. The second class is the extra energy for transmitting the embedded information. The third one is caused by the message transmissions that cannot eventually yield successful location transformation to the destination LCS. Note that the three classes of energy consumption should be recalculated whenever the network topology has changed. Thus, the mobility model should also be considered in the design of energy consumption metrics via probability based analysis (such as Markov model). Moreover, on-demand fast localization may cause extra delay on message delivery as the intermediate users may have to wait for enough information to transform the locations. We propose to treat the delay as a punishment on energy saving as it may cause retransmissions.

Position Privacy

In mobile networks, the information source may only want to share its location with intermediate users and the destinations but not with others. This requirement is practical for many applications although it has seldom been studied under the traditional localization definition.

Using the conventional localization techniques, all the users that can overhear the LBS messages can decode the source position as they are all localized in the same coordinate system. On the contrary, in the framework of ODFL, users that are not on the routing path do not calculate their positions. Even if they try to localize themselves, their positions are only available in their own CLCSs. As a result, they cannot directly decode the embedded source position even if they can capture the messages. Moreover, they may fail to transform the captured source position to the corresponding ones in their CLCSs because of the lack of information for position transformations. Therefore, the framework of ODFL can also reduce source position leakage during the procedures of localization and message transmission.

Simulations

Figure 5A:
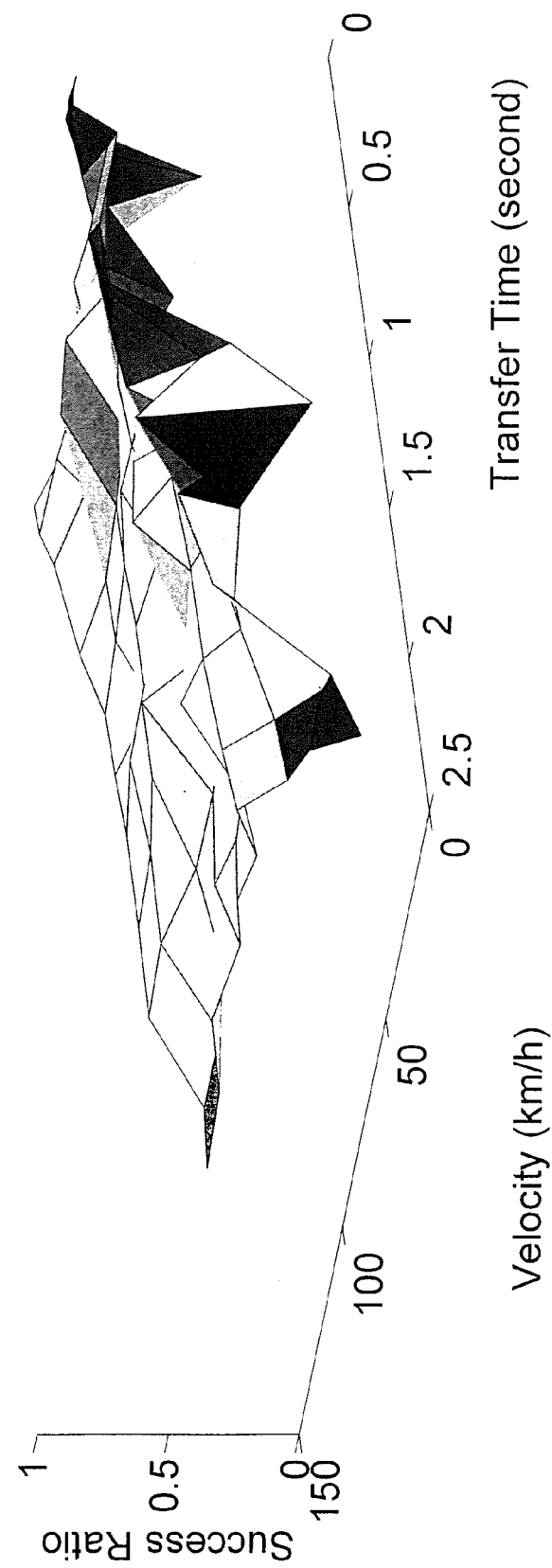
FIGS. 5A to 5E are graphical representations of simulation results.
Figure 5B:
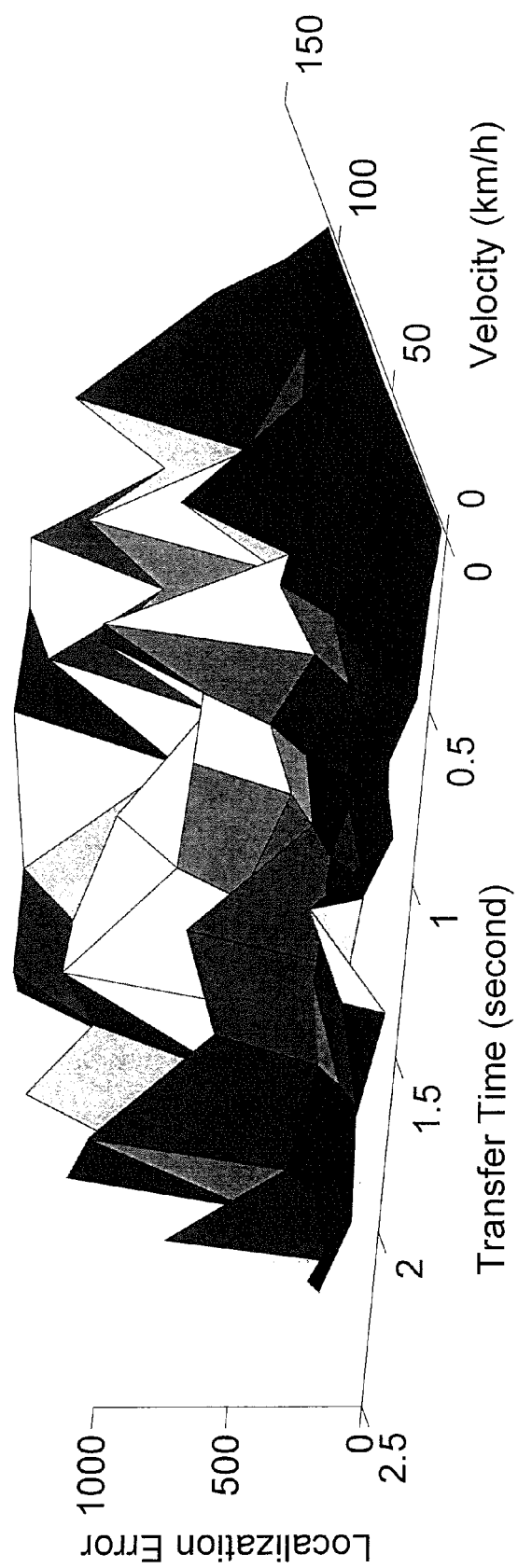
Figure 5C:
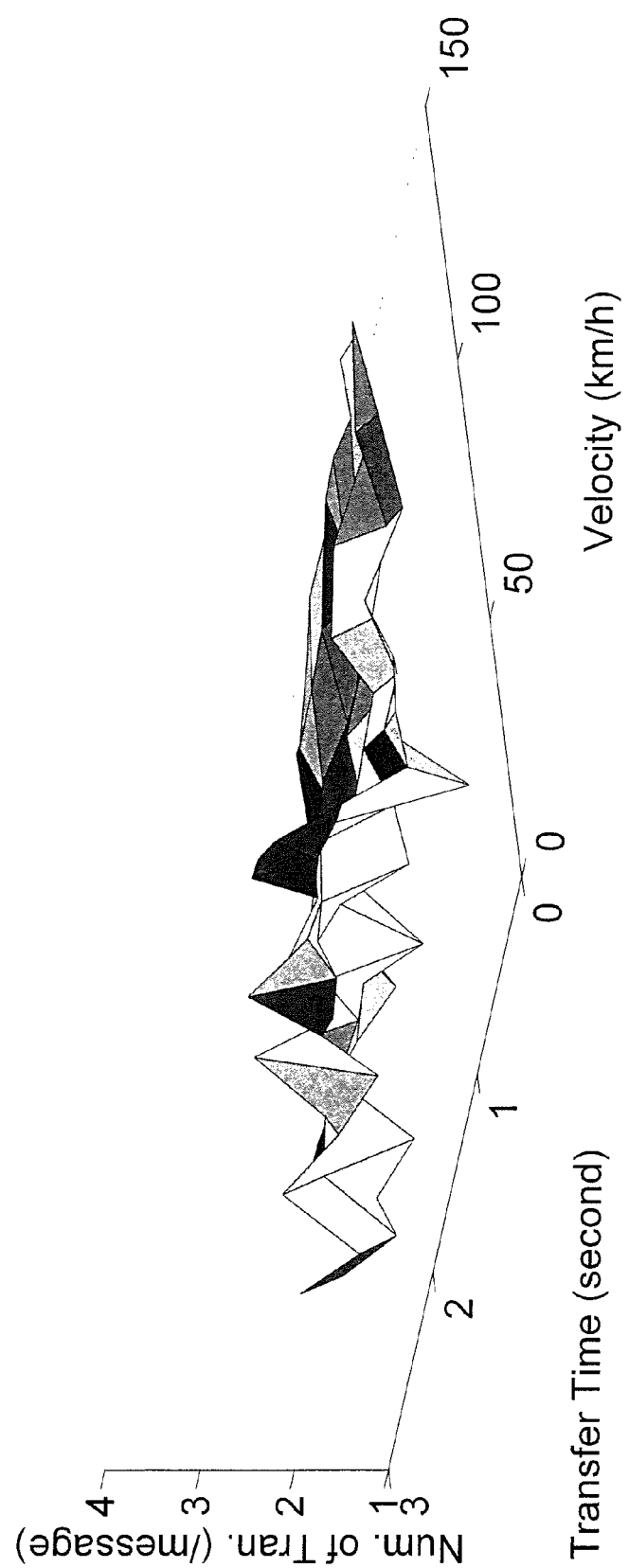

We evaluate the performance of ODFL over AODV using the INETMANET simulation models. In the simulations, 29 mobile users are randomly deployed in a 1200×1200 (meter) playground, One mobile user is initially deployed at location (100, 100) as the information source, and one static station is deployed at (1100, 1100) as the destination. The information source periodically sends UDP packets as LBS messages to the destination. The mobile user velocity vary from 3.6 km/h to 108 km/h. The success ratio and the eventual the localization time are obtained based on the UPD success ratio and the UPD delay, respectively. FIGS. 5A to 5C reports the simulation results under the impacts of the user velocity and the transfer time, which vary from 0.01 s to 2.2 s. Each reported point in the figures is an average of 150 instances over 3000 s simulation time.

Figure 5D:
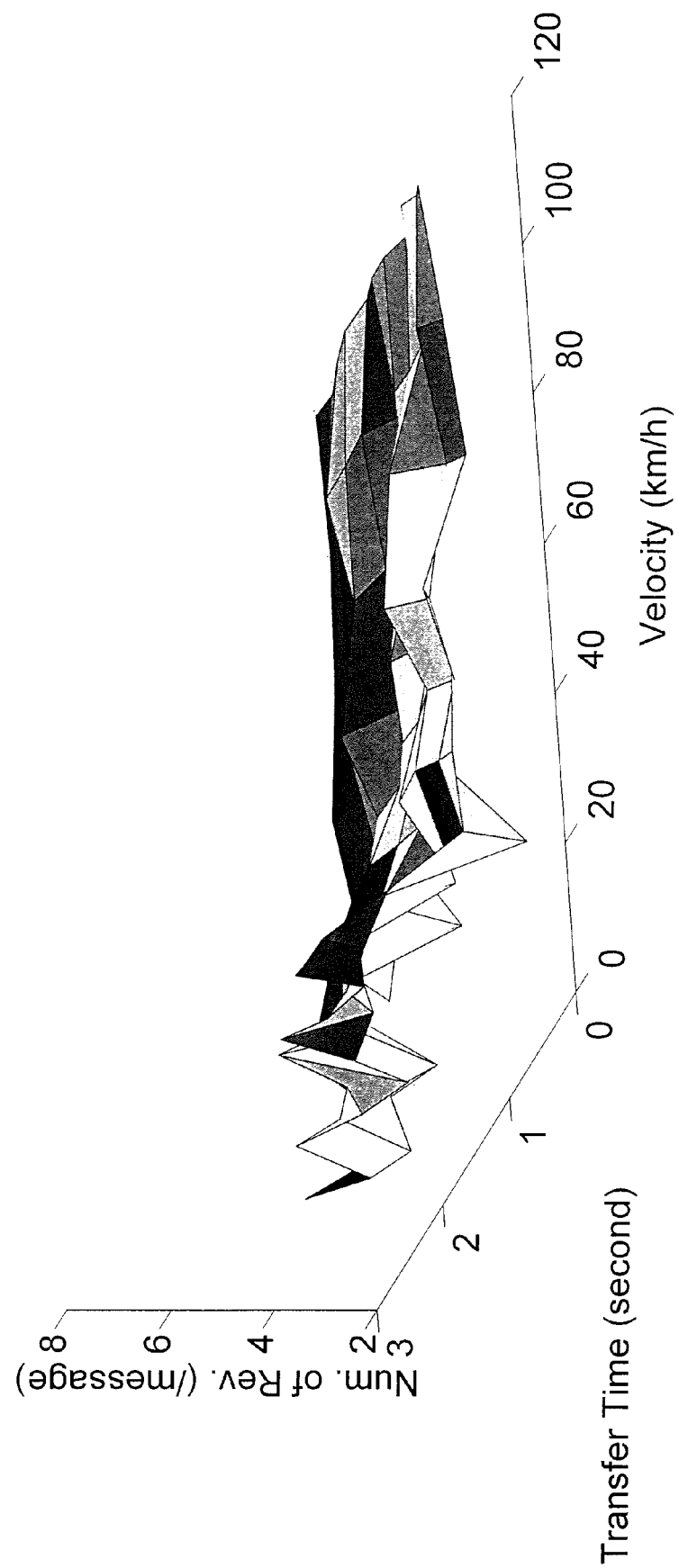
Figure 5E:
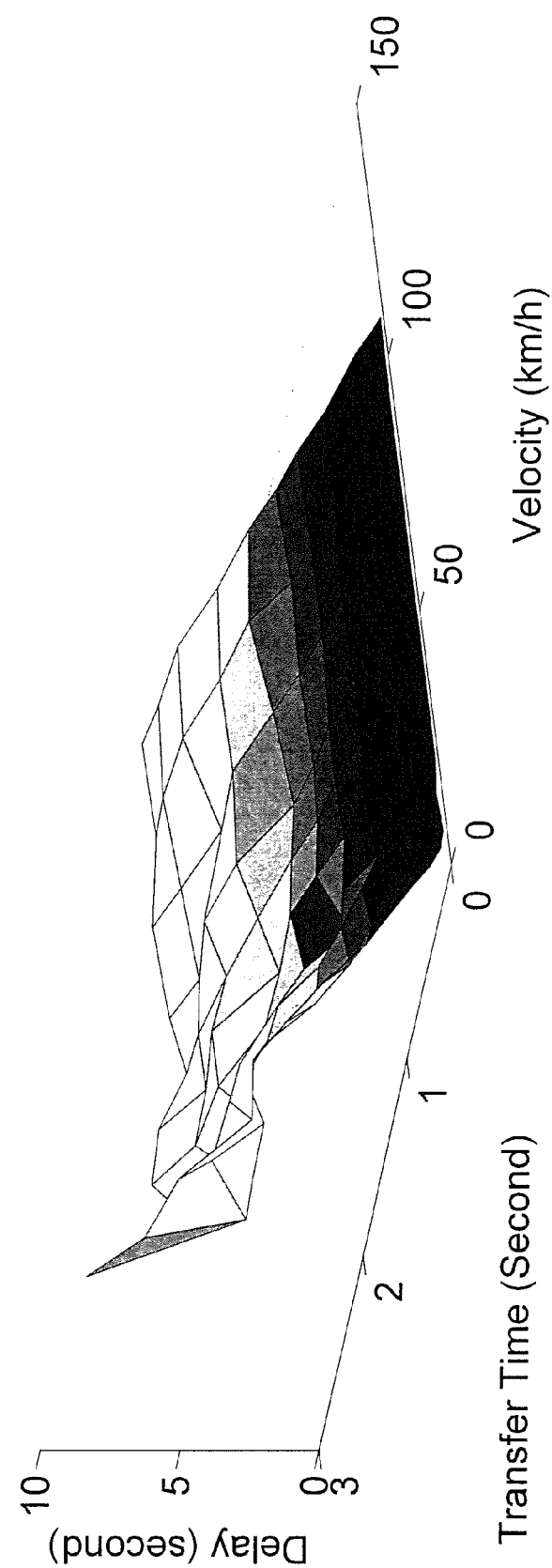

FIG. 5A reports the success ratio of LBS applications under ODFL. We can see that the success ratio can almost reach 1 when the transfer time is less than 0.3 s, and that it generally decreases with the increasing of the transfer time and the user velocity. The reason is that the set of two-hop neighbors at the next-hop user may change frequently with a longer transfer time if the users move faster. As a result, the next-hop user has lesser chance to find three non-collinear commons users from the previous embedded information for the position transformation. Similar observations can also be obtained for localization accuracy from FIG. 5B. Theoretically, the localization error is more sensitive to the neighbor changing because not only the number of bridge users but also their positions an affect the localization result according to Equation (2). Based on the results, the obtained source positions are only valid when the transfer time is less than 0.3 s or the user velocity is less than 25 km/h. We can also see why the conventional localization techniques could be an endless process in mobile networks from FIG. 5B, for the minimum network localization time $T_{min}$ is generally much larger than 0.3 s. The energy consumptions of ODFL are reported in FIG. 5C and FIG. 5D in terms of the number of transmissions and the number of receptions at each user for each LBS message, respectively. It is interesting to observe that the transfer time has less impact on the energy consumption than the user velocity, and that the energy consumption decreases with the increasing velocity. This is partially due to the smaller success ratio at higher velocity, where the LBS messages are dropped before transmitting to the destination. FIG. 5E reports the localization time of ODFL in terms of LBS message transmission delay. We can see that the transfer time dominates the changes of eventual localization time, and that high velocity can help with reducing the delay as the movement of mobile users may reduce the number of hops to the destination. In summary, the ODFL implementation over AODV can successfully support the LBS applications in mobile networks, when the transfer time is less than 0.3 s or the user velocity is less than 25 km/h, with low energy consumption.

The invention has been described in terms of land based vehicles, both military in a battlefield or civilian in traffic; however, other applications will suggest themselves to those skilled in the art. For example, the invention has applications in underwater networks where AUVs and nodes work in an environment where energy is limited (powered by battery), transmission delay is long (long distance acoustic communications), there is no GPS signal, and the amount of transmissions are relatively small. As AUVs and nodes are moving with sea current or self-powered, the conventional localization procedure would continuously consume the limited energy and the location accuracy is low or even not acceptable. Applying the teachings of the invention can remedy the situation by providing ODFL service with higher location accuracy and less energy consumption. Similarly, the invention could have applications in air traffic control.

With the popularity of device-to-device communications, such as provided by smart phones, the invention could also be applied to ad-hoc based social applications. Personal devices such as smart phones are energy constrained, and users may want to protect their location privacy while utilizing the location services. The invention meets the requirements of conserving energy while protecting location privacy.

While the invention has been described in terms of a single preferred embodiment, those skilled in the art will recognize that the invention can be practiced with modification within the spirit and scope of the appended claims.

The invention claimed is:

1. A self-organized networking system comprising:
a plurality of mobile users organized in a mobile ad-hoc network, each user in the network forming a node in the network and requiring on-demand communication routing with other users in the network, each user including a transmitter and a receiver;
each user transmitting a broadcast information-request message to its direct neighbors in the network and receiving replies with information of a one-hop topology from its direct neighbors and, based on the replies from its direct neighbors, constructing using a data processor included at the user a local coordinate system by finding three mutually connected users;
each user transmitting information to another user in the network, each user as a source of a transmission of information to another user as a destination of the transmission of information using the data processor and a data source for embedding encoded source position in transmitted information;
each user receiving a transmission of information as a destination of a transmission of information from a source of the transmission of information accessing the data source by the data processor for decoding the source position embedded in the received transmission information;
wherein local coordinate systems are created at each node in the network and the data processor of each user accessing its respective database to perform local coordinate system position transformation between consecutive nodes along a route of the transmission of information thereby integrating localization procedure with routing to support time-critical location based service applications in the mobile ad hoc network.

2. The system of claim 1, wherein the system maintains position privacy since users not on a routing path do not calculate their positions.

3. The system of claim 1, wherein the system minimizes energy consumption by integrating parts of the localization transmissions with the application's payload transmissions.

4. The system of claim 1, wherein each of the mobile users are land based vehicles.

5. The system of claim 4, wherein the land based vehicles are military vehicles located in a battlefield.

6. The system of claim 4, wherein the land based vehicles re civilian vehicles based in traffic.

7. The system of claim 1, wherein the nodes of the ad-hoc network are personal devices enabling device-to-device communication.

8. The system of claim 1, wherein the ad-hoc network is an under water network and the nodes are underwater vehicles.

9. The method of claim 1, wherein the ad-hoc network is an under water network and the nodes are underwater vehicles.

10. A self-organized networking method comprising the steps of:
providing a plurality of mobile users organized in a mobile ad-hoc network, each user in the network forming a node in the network and requiring on-demand communication routing with other users in the network, each user including a transmitter and a receiver;
transmitting by a user a broadcast information-request message to its direct neighbors in the network and receiving replies with information of a one-hop topology from its direct neighbors and, based on the replies from its direct neighbors, constructing using a data processor included at the user a local coordinate system by finding three mutually connected users;

transmitting by the user information to another user in the network, each user as a source of a transmission of information to another user as a destination of the transmission of information using the data processor and a data source for embedding encoded source position in transmitted information;

receiving by a destination user a transmission of information as a destination of a transmission of information from a source user of the transmission of information, the destination user accessing the data source by the data processor for decoding the source position embedded in the received transmission information;

wherein local coordinate systems are created at each node in the network and the data processor of each user accessing its respective database to perform local coordinate system position transformation between consecutive nodes along a route of the transmission of information thereby integrating localization procedure with routing to support time-critical location based service applications in the mobile ad-hoc network.

11. The method of claim 10, wherein the system maintains position privacy since users not on a routing path do not calculate their positions.

12. The method of claim 10, wherein the system minimizes energy consumption by integrating parts of the localization transmissions with the application's payload transmissions.

13. The method of claim 10, wherein each of the mobile users are land based vehicles.

14. The method of claim 13, wherein the land based vehicles are military vehicles located in a battlefield.

15. The method of claim 13, wherein the land based vehicles re civilian vehicles based in traffic.

16. The method of claim 10, wherein the nodes of the ad-hoc network are personal devices enabling device-to-device communication.

* * * * *